United States Patent [19]

Thanisch

[11] Patent Number: 4,877,144
[45] Date of Patent: Oct. 31, 1989

[54] PLASTIC THREADED SLEEVE

[75] Inventor: Klaus Thanisch, Zell, Fed. Rep. of Germany

[73] Assignee: Zeller Plastik Koehn, Graebner & Co., Zell, Fed. Rep. of Germany

[21] Appl. No.: 168,957

[22] Filed: Mar. 16, 1988

[30] Foreign Application Priority Data

Mar. 16, 1987 [DE] Fed. Rep. of Germany ....... 3708472

[51] Int. Cl.⁴ ............................................. B65D 41/04
[52] U.S. Cl. .................................................... 215/330
[58] Field of Search ............... 215/330, 332, 329, 318; 220/296, 288

[56] References Cited

U.S. PATENT DOCUMENTS

| 2,171,015 | 8/1939 | Webb | 215/318 |
| 2,989,203 | 6/1961 | Bramming | 220/296 X |
| 4,387,822 | 6/1983 | Lynn | 215/330 |
| 4,721,220 | 1/1988 | Northup | 215/329 X |
| 4,736,859 | 4/1988 | Mayes et al. | 215/330 |

FOREIGN PATENT DOCUMENTS 646323  9/1962  Italy ..................................... 215/330

Primary Examiner—Donald F. Norton
Attorney, Agent, or Firm—Wells & White

[57] ABSTRACT

A threaded sleeve of plastics material, e.g. in the form of a cap, which is suitable for screwing onto a bottle opening with an external thread. The thread of the threaded sleeve is divided into segments. These segments can be separated from one another in the peripheral direction by spaces of at least 0.4 mm and can have a length in the peripheral direction of 3 to 10 mm. Threaded sleeves of this type can be manufactured with simply constructed moulds and demoulded in a simple manner. After the demoulding the thread segments do not mark the external wall of the threaded sleeves.

6 Claims, 1 Drawing Sheet

PLASTIC THREADED SLEEVE

The invention relates to a threaded sleeve with a thread projecting from its inner wall. The threaded sleeve can be the wall of a threaded cap, e.g. a closure cap for a bottle mouth with a pouring opening with or without a lid.

Such threaded sleeves have at least one projecting thread (or thread rib). For manufacture in a moulding, particularly an injection moulding process an appropriately shaped core must be provided within the mould.

It is known after the injection of the threaded sleeve to demould it by screwing the mould core out. This complicates the mould due to the necessary screwing process but produces mouldings with a particularly good appearance, whereby a critical factor is that the projecting threads do not mark the outer wall of the threaded sleeves.

If relatively simple moulds are used, with which the moulding is forceably pulled in the axial direction over the core provided with thread grooves, considerable forces are exerted in the peripheral direction on the projecting threads on the moulding and thus on its wall. The consequence is that the projecting threads strongly mark the outer wall which is undesirable.

If threaded cores are used which after the injection process can be contracted inwardly (collapsible cores) then the demoulding can be more rapid than when screwing out the mould core but expensive mould cores are required which are also subject to a high degree of wear.

The present invention is to provide a threaded sleeve which may be manufactured from plastic material with simply constructed moulds, may be demoulded in a simple manner and with which after the demoulding the projecting threads do not mark the outer wall or only to a negligible extent. The invention is also to be applicable to relatively hard plastic materials, such as polypropylene.

It is also an object that currently available moulds, which are used for the manufacture of force fitted members, particularly closures, that is to say of closures with inwardly extending projections which all lie in a common radial plane, can also be used for the fabrication of threaded sleeves, particularly threaded closures, if only their inner mould member is exchanged.

Threaded sleeves in accordance with the invention can be manufactured with rigid cores, that is to say those which are not inwardly collapsible. They are withdrawn in the axial direction after the injection process. During this the wall of the threaded sleeves stretches in the peripheral direction. Since, however, the segments are mutually offset in the peripheral direction, a very much larger portion of segment-free wall can accommodate stretching for each segment so that the wall material is not excessively stretched and no traces, i.e. markings, of the segments remain on the outer wall. Furthermore, a proportion of the peripheral stretching can be accommodated by the regions between the segments.

The segments have such a thread profile that by virtue of an oblique position and/or rounding of their surfaces which are stressed during the pulling out process they facilitate the demoulding by a sliding out of the segments from corresponding recesses in the mould core.

It is known to divide the projecting portions of a thread into segments. Such a feature is however deliberately used in the present invention with threaded sleeves injected from plastic material to produce sleeves with external surfaces of high quality, that is to say external surfaces which are not marked by components of the thread, despite a rational demoulding by axial withdrawing of the mould core.

FURTHER FEATURES OF THE INVENTION

The spaces between the segments can have a certain minimum size. The smaller the spaces the cleaner the screwing function, the larger they are the less may the position of the segments be recognised on the external wall.

If the threaded sleeve has more than one projecting thread, then the segments of one projecting thread can be prevented from snapping into the openings in the core of the projecting thread above it when axially withdrawing the core.

In the case of plastic bottles with a threaded mouth, the problem occurs that screw caps or the like become loose again by themselves after having been screwed on. This is particularly the case when the bottle mouths are wet and/or have multiple threads. A reverse rotation lock may be formed in a simple manner, namely by appropriate shaping of at least one of the segments, which lock cooperates with a corresponding radial projection on the other thread portion, i.e. in this case on the bottle mouth.

The reverse rotation lock may be so shaped that the user can unscrew the threaded portion with the exertion of a small force.

On the other hand, unscrewing is to be completely prevented. This is advantageous with closure members which are provided with a lid, that is to say are not themselves to be unscrewed. Such closure members have been previously force fitted.

More recent methods of fabrication permit plastic bottles to be manufactured with even thinner walls. In this manner material is saved. On the other hand, such bottle mouths cannot withstand a forceable application but are deformed inwardly. In such cases a forceably applied closure may be replaced by a threaded closure with a reverse rotation lock.

Exemplary embodiments with further features of the invention will be described below with reference to the drawings.

Figure 1:
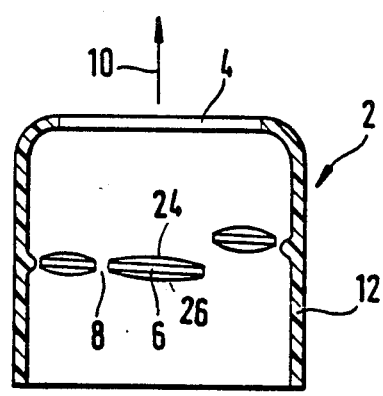
FIG. 1 is a longitudinal section through a threaded sleeve in accordance with the invention.

FIG. 1 shows a threaded sleeve 2 in the form of a cap with a large discharge opening 4. The invention is applicable to caps of widely varying type and to purely circularly cylindrical or conical threaded sleeves. Of importance is that the thread of the threaded sleeve is divided into individual inwardly projecting segments 6. FIG. 1 shows a thread with only one thread rib. The segments are uniformly distributed over the inner periphery. Between each two segments there is a space 8 of 0.5 mm or more in the peripheral direction. After the injection moulding process the threaded sleeve 2 is withdrawn in the direction of the arrow 10 from the mould core, which is not illustrated. In this process the wall of the threaded sleeve is stretched, particularly at the points outside the segments.

As shown in FIG. 1, the upper 24 and lower 26 surfaces of the segments 6 bulge outwardly. This is important primarily for the upper surface because this must ensure that the segments can slide out of the corresponding mould recesses during demoulding. The upper surfaces can be oblique flat surfaces or arched surfaces or radially extending surfaces which are rounded towards the interior space.

Figure 2:
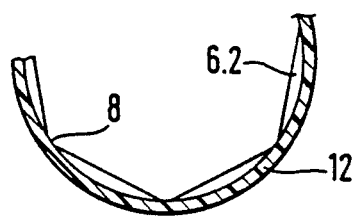
FIGS. 2 to 5 are schematic partial sections through threaded sleeves in accordance with the invention with segments of different shapes.
Figure 3:
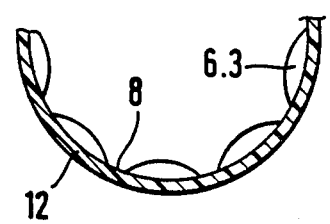
Figure 4:
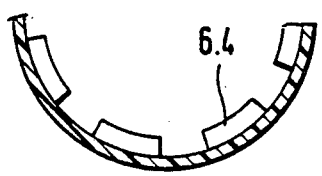

The segments can have differing shapes, as is shown in FIGS. 2 to 5 in connection with the segments 6.2 to 6.5 provided therein. In FIG. 2 they have a straight inner edge, in FIG. 3 an arcuate one. In FIG. 4 the segments are of approximately trapezoidal shape whilst in FIG. 5 they are rounded at their ends, all as seen in the axial direction the segments taper in the peripheral direction towards their ends, as is specially shown in FIGS. 2 and 3, a greater degree of stretching can be accommodated by these end sections of the segments than by their middle sections. This militates additionally against a marking of the segments on the outer wall of the threaded sleeve. By contrast, the segments in FIGS. 4 and 5 have the advantage of greater strength and can thus be used for the transmission of larger closing forces.

Figure 6:
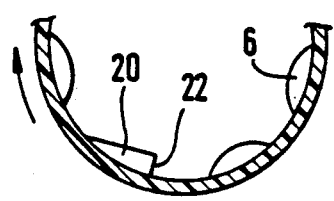
FIG. 6 is a partial section through a threaded sleeve with a reverse rotation lock.
Figure 7:
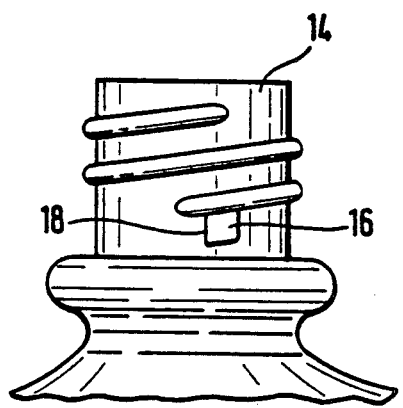
FIG. 7 is an elevation of a bottle mouth with a reverse rotation lock.
Figure 5:
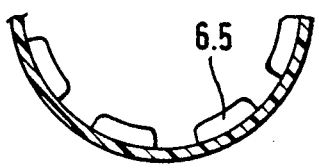

FIGS. 6 and 7 show a portion of a threaded sleeve or a bottle mouth with a reverse rotation lock. For this purpose the bottle mouth 14 has a radial projection 16 at the lower end of its thread. The projection has a wall 18 which lies in an axial-radial plane. FIG. 6 is a partial section transverse to the axis through an associated threaded sleeve with the sectional plane lying above the illustrated segments. The viewing direction is upwards with respect to the threaded mouth of FIG. 7.

Whilst most segments 6 are constructed as described above, at least one of them (20) has a locking surface 22 which catches behind the wall 18 of the projection 16 of the bottle opening when the sleeve is fully screwed on. The segment 20, which is constructed as a reverse rotation lock, can be the lowermost, as in FIG. 7, which leads during the screwing up process. Alternatively, it can be provided at a different position. A plurality of segments can also be constructed as reverse rotation locks.

If the wall 18 of the bottle mouth and the locking surface 22 of the segment 20 extend radially then a reverse rotation is prevented after the catching. Having regard to the extensibility of the plastics, a relatively large security against reverse rotation can be created if both surfaces are additionally inclined with respect to the axial-radial plane in such a sense that both members, namely segment 20 and projection 16, become even more wedged when a load is applied in the reverse rotary direction.

If, on the other hand, a reverse rotation is to be possible but a spontaneous release of the closure is to be rendered impossible, the locking surface 22 and the wall 18 can be inclined in the opposite sense, that is to say in such a manner that the segment 20 is pressed outwardly on reverse rotation and then snaps back over the projection 18.

If a thread having more than one projecting thread is defined by the segments 6 to 6.5, then the segments of the one projecting thread should be offset with respect to those of the next and with respect to those of the optional further projecting thread in the peripheral direction. In this manner the segments are prevented during demoulding from snapping from one recess in the mould core into the next one which would result in a repeated stretching of the wall 12 of the threaded sleeve and would be associated with the danger that the segments would then mark its outer wall.

I claim:

1. A threaded sleeve closure having a circumference and an axis manufactured by a process which includes stripping the finished closure from a mold in the direction of said axis, comprising:

(a) a skirt;
    (b) screw thread means for mating with a thread on a neck of a container, said thread means being formed on a helical path on the interior surface of said skirt which corresponds and mates with a helical screw thread formed on the neck of a container which is to receive the closure, said closure helical path extending one full turn around said closure skirt circumference, said container helical screw thread extending for more than one full turn around said neck;
    (c) said screw thread means including a plurality of spaced thread segments located on said closure helical path;
    (d) said segments having a base occupying a given surface area on said skirt and tapering to edges having a surface area less than said given surface area, thereby permitting said closure to be stripped from a mould in said direction of said axis; and
    (e) said segments separated from one another in the direction of said circumference by spaces shorter than said segments.

2. The threaded sleeve closure of claim 1, wherein the segments are separated from one another in the direction of said circumference by spaces of at least 0.4 mm.

3. The threaded sleeve closure of claim 1, wherein the segments have a length in the direction of said circumference of 3 to 10 mm.

4. The threaded sleeve closure of claim 1, wherein an axial projection is located in said container helical screw threads at least one of said segments has a flat leading edge in the direction of said circumference and said flat leading edge and said projection cooperate to define a reverse rotation lock.

5. The threaded sleeve closure of claim 1, wherein said segments are arcuate.

6. The threaded sleeve closure of claim 1, wherein said segments are trapezoidal.

* * * * *